(No Model.)	2 Sheets—Sheet 1.
P. G. TOEPFER.
APPARATUS FOR MALTING GRAIN.

No. 400,807.  Patented Apr. 2, 1889.

Witnesses
Geo. W. Young.
N. E. Oliphant.

Inventor
Peter G. Toepfer
By [signature]
Attorneys (No Model.) 2 Sheets—Sheet 2.

P. G. TOEPFER.
APPARATUS FOR MALTING GRAIN.

No. 400,807. Patented Apr. 2, 1889.

Witnesses
Geo. W. Young
N. E. Oliphant

Inventor
Peter G. Toepfer
By Hurd & Underwood
Attorneys

UNITED STATES PATENT OFFICE.

PETER G. TOEPFER, OF MILWAUKEE, WISCONSIN.

APPARATUS FOR MALTING GRAIN.

SPECIFICATION forming part of Letters Patent No. 400,807, dated April 2, 1889.

Application filed June 8, 1888. Serial No. 276,458. (No model.)

*To all whom it may concern:*

Be it known that I, PETER G. TOEPFER, of Milwaukee, in the county of Milwaukee, and in the State of Wisconsin, have invented certain new and useful Improvements in Apparatus for Malting Grain; and I do hereby declare that the following is a full, clear, and exact description thereof.

My invention relates to apparatus for malting grain, and will be fully described hereinafter.

Figure 1:
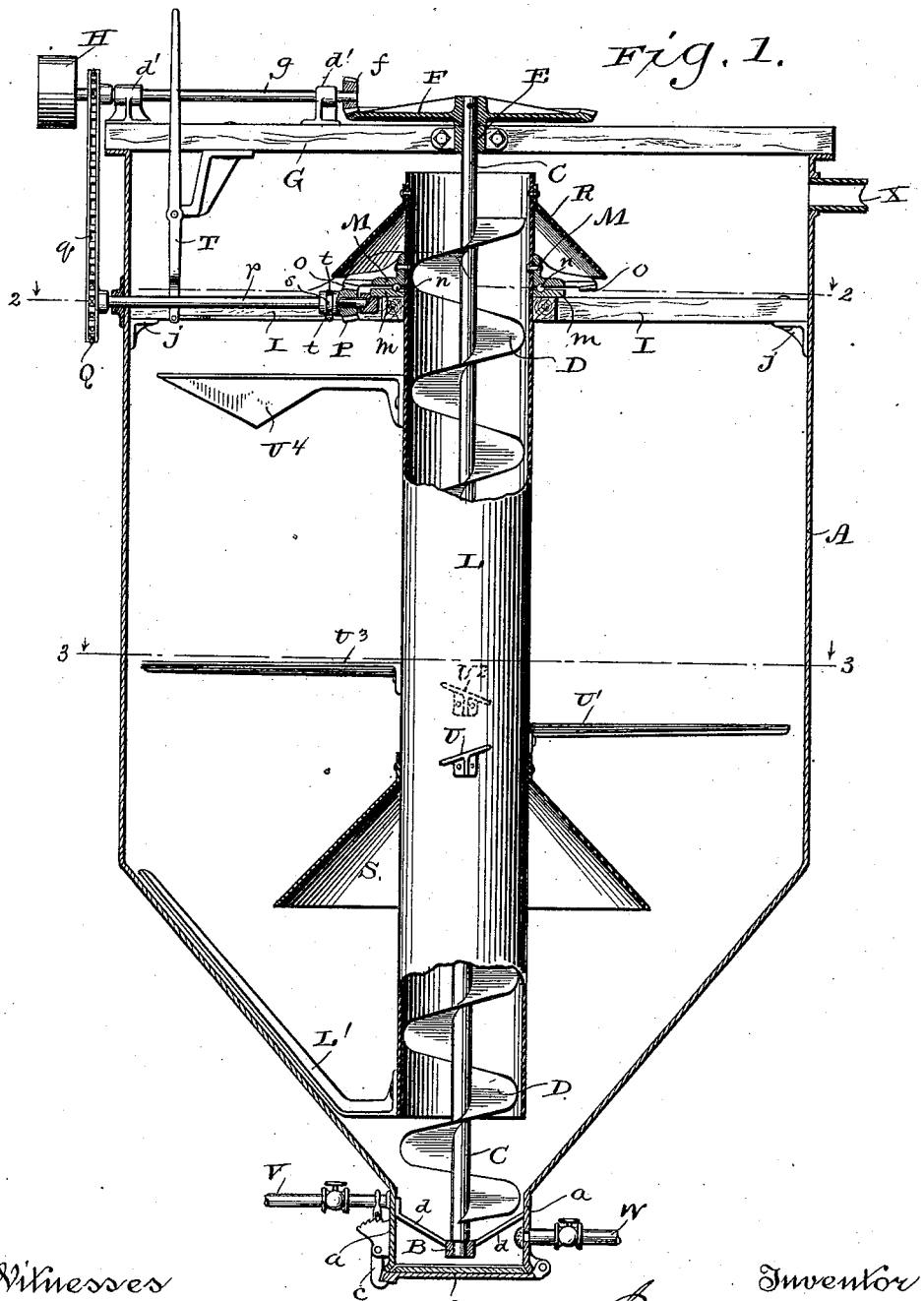
Figure 2:
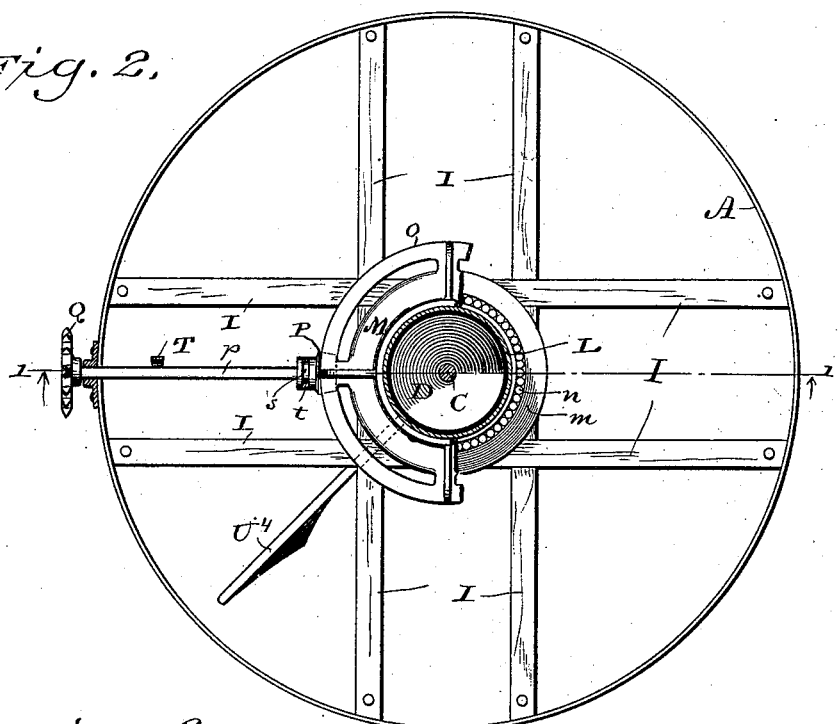
Figure 3:
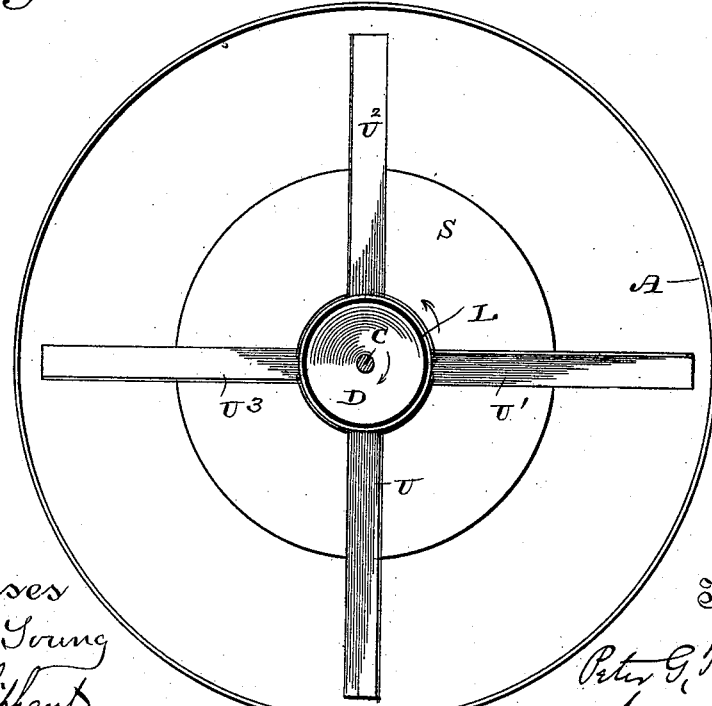

In the drawings, Figure 1 is a vertical section of my apparatus on line 1 1, Fig. 2. Fig. 2 is a section on line 2 2, Fig. 1; and Fig. 3 is a section on line 3 3, Fig. 1.

A is a tank the bottom of which is inclined or funnel-shaped and terminates in a spout, $a$, which is closed by a trap-door, $b$, which is securely locked when closed by a latch, $c$. A step, B, is suspended in this spout $a$ by spider-arms $p$, and this step forms the lower bearing for the shaft C of an upright screw conveyer, D. The upper end of shaft C has its bearing at E, and above this carries a horizontal bevel-wheel, F, which is turned by a bevel-pinion, $f$, of a shaft, $g$, that has its bearings at $d'$ $d'$ on one of the cross-beams G, and is belted through pulley H to any suitable driving-power.

I I are cross-beams, that are secured to brackets $j$ on the inside of the tank, and in the rectangle formed by the crossing of these beams I suspend the tube L, that contains the conveyer-shaft, by means of a turn-table composed of an annular plate, $m$, that rests on the cross-pieces, and an annular angle-plate, M, that encircles and is secured to the conveyer-tube. Both of these annular plates are grooved, as shown in Fig. 1, and spheres $n$ are interposed between them in said grooves to reduce friction and facilitate the turning of the tube.

The outer portion of plate M has bevel-teeth $o$ formed on its under side for engagement with a bevel-pinion, P, that is carried by shaft $p$, which on its outer end carries a spur-wheel, Q, that is connected by a belt, $q$, with a like sprocket-wheel on shaft $g$. The bevel-pinion P is merely splined on its shaft, and is formed with a hub having a groove, $s$, to receive a collar, $t$, and this collar is connected with a lever, T, that is suitably suspended from the beam G.

The tube L is formed with a hood, R, that serves to cover the turn-table and the gearing by which it is operated, and is also provided with another hood, S, much lower down, to deflect the grain out toward the sides of the tank; and beneath this last-named hood the tube L is provided with an arm, L', which projects out therefrom, first at right angles, and then is inclined upward, so that it lies parallel to the funnel-shaped bottom of the tank. Above this and standing above the lower hood I provide the tube L with other arms, U U' U$^2$ U$^3$, which project from the hood at right angles to it, each on a different plane and with their greatest width at an angle of about forty-five degrees to the axis of the tube, so that when the tube is turned they act with each other to form a conveyer to force the grain down below the bottom opening of the tube L. To prevent the packing of the grain above these arms, I provide the tube with still another arm, U$^4$, which has a half-diamond-shaped blade, which as it plows through the grain keeps it evenly distributed.

V is an inlet-pipe, and W an outlet or drain pipe.

X is an overflow-pipe.

In the operation the grain is dumped into the tank from above, and the steeping-water is let in through pipe V, and the machinery is started, the shaft $g$ driving the conveyer-shaft in one direction, while the shaft $p$ drives the tube in the other, so that while the arms of the tube L are carrying the grain down on the outside of the tube the conveyer is carrying it up on the inside, and thus a gentle circulation is kept up while the grain is being washed and steeped, and then when the grain has been sufficiently washed and steeped the water may be drained off through pipe W and the water cut off from pipe V and cool moist air admitted to permit it to germinate, and this cool moist air may be replaced by warm moist air to dry it, and all this may be done while the conveyer and tube are in motion.

If it is found that it is unnecessary to revolve the tube during any particular stage of the process, then by means of lever T the driving mechanism of the tube may be drawn out of gear, and the tube will stop while the motion of the conveyer will continue.

Having thus fully described my invention, what I claim as new, and desire to secure by Letters Patent, is—

1. The combination, with the tank, of a spiral conveyer supported therein, and means for revolving the same, a tube surrounding said conveyer provided with conveyer-arms, and means for revolving said tube, substantially as described.

2. The combination, with the tank, of a spiral conveyer supported therein, and means for revolving the same, a tube surrounding said conveyer and means for revolving it, deflecting-hoods carried by said tube, and a plowing-arm projecting from said tube between the hoods, substantially as described.

In testimony that I claim the foregoing I have hereunto set my hand, at Milwaukee, in the county of Milwaukee and State of Wisconsin, in the presence of two witnesses.

PETER G. TOEPFER.

Witnesses:
S. S. STOUT,
N. E. OLIPHANT.